(12) United States Patent
Tolan et al.

(10) Patent No.: US 10,996,543 B2
(45) Date of Patent: May 4, 2021

(54) COMBINATION HIGH POWER LED STROBE AND CONTINUOUS LIGHT

(71) Applicant: Light & Motion Industries, Marina, CA (US)

(72) Inventors: David William Tolan, Carmel, CA (US); Brooks Pattrick Lame, Seaside, CA (US); Alejandro Cota, San Jose, CA (US); Daniel T. Emerson, Carmel, CA (US)

(73) Assignee: Light & Motion Industries, Marina, CA (US)

( * ) Notice: Subject to any disclaimer, the term of this patent is extended or adjusted under 35 U.S.C. 154(b) by 0 days.

(21) Appl. No.: 16/581,576

(22) Filed: Sep. 24, 2019

(65) Prior Publication Data
US 2021/0003905 A1    Jan. 7, 2021

Related U.S. Application Data (60) Provisional application No. 62/735,791, filed on Sep. 24, 2018.

(51) Int. Cl.
*G03B 15/05* (2021.01)
*H05B 45/14* (2020.01)
(Continued)

(52) U.S. Cl.
CPC ............... *G03B 15/05* (2013.01); *F21L 4/02* (2013.01); *F21V 17/14* (2013.01); *F21V 21/406* (2013.01);
(Continued)

(58) Field of Classification Search
CPC ......... G03B 15/05; G03B 7/16; F21V 29/773; F21V 23/0407; H05B 45/10; H05B 45/14; H05B 41/30
See application file for complete search history.

(56) References Cited

U.S. PATENT DOCUMENTS

| | | | |
|---|---|---|---|
| 3,676,736 A | 7/1972 | Starer | |
| 6,317,566 B1 * | 11/2001 | Kagaya | H05B 41/32 396/176 |

(Continued)

FOREIGN PATENT DOCUMENTS

| | | |
|---|---|---|
| EP | 2306550 | 4/2011 |
| WO | WO2011006209 | 1/2011 |

(Continued)

*Primary Examiner* — Thai Pham
(74) *Attorney, Agent, or Firm* — Thomas M. Freiburger (57) ABSTRACT

An LED light is operated in both continuous steady output and, as desired, a periodic high power burst of light that drives the LED beyond its rated output for short periods. A single cost effective circuit to perform both types of control delivers highly regulated output under both high power burst mode and continuous mode while maintaining maximum feedback resolution in the primary (continuous) output mode. Active elements are used to switch the signals from conventional current sensing elements through a controlled scaling network before joining the rest of the regulating circuit. This results in ability to produce a high efficiency, well-regulated, fast rise and fall, rectangular average peak value waveform, electric current pulse to power a single or combination of LEDs to a high output level, effecting a transition between a constant lighting level and a higher output, pulsed duration lighting level for photographic and motion image capture.

19 Claims, 9 Drawing Sheets

Block Example, Controlled Scaling Network Method Applied to a Generalized Switching Regulator Circuit (51) Int. Cl.
  *F21L 4/02*  (2006.01)
  *F21V 21/40*  (2006.01)
  *F21V 29/89*  (2015.01)
  *H05B 47/19*  (2020.01)
  *F21V 29/77*  (2015.01)
  *F21V 17/14*  (2006.01)
  *F21V 31/00*  (2006.01)
  *F21Y 115/10*  (2016.01)

(52) U.S. Cl.
  CPC ............ *F21V 29/773* (2015.01); *F21V 29/89* (2015.01); *F21V 31/005* (2013.01); *H05B 45/14* (2020.01); *H05B 47/19* (2020.01); *F21Y 2115/10* (2016.08)

(56) References Cited

U.S. PATENT DOCUMENTS

| | | | |
|---|---|---|---|
| 6,778,764 | B2 | 8/2004 | Barghini et al. |
| 9,322,518 | B1 | 4/2016 | Steedly |
| 10,448,503 | B1 | 10/2019 | Emerson et al. |
| 2005/0265709 | A1* | 12/2005 | Kim .................. H04N 5/23241 396/205 |
| 2007/0109775 | A1 | 5/2007 | Chen |
| 2009/0261748 | A1* | 10/2009 | McKinney ............. H05B 45/37 315/254 |
| 2012/0044374 | A1* | 2/2012 | Pohlert ................ H04N 5/2256 348/220.1 |
| 2012/0140433 | A1 | 6/2012 | Armer et al. |
| 2013/0141635 | A1 | 6/2013 | Lebens et al. |
| 2014/0301066 | A1 | 10/2014 | Inskeep |
| 2017/0068118 | A1 | 3/2017 | Schweickert et al. |
| 2018/0020515 | A1* | 1/2018 | Rutgers ................. H05B 45/10 |
| 2019/0123095 | A1 | 4/2019 | Schrama et al. |

FOREIGN PATENT DOCUMENTS

| | | |
|---|---|---|
| WO | WO2015149512 | 10/2015 |
| WO | WO2018170501 | 9/2018 |

\* cited by examiner

PRIOR ART

COMBINATION HIGH POWER LED STROBE AND CONTINUOUS LIGHT

BACKGROUND AND SUMMARY OF THE INVENTION

This application claims benefit of provisional application Ser. No. 62/735,791, filed Sep. 24, 2018.

The invention concerns LED lighting, particularly for photography and video.

Location photography and video work require different types of light. Photographers often need high power strobes to capture motion or add fill light under strong ambient light such as in direct sun. Video shooters need continuous light to properly light their scenes. Strobes use gas filled tubes that generate a high power flash of light when exposed to a high voltage charge. Strobes take time to recharge before the next flash. The light from strobes is hard to control and much of the light they produce falls outside the image that is captured on the camera sensor. To control the light, strobes may add fabric boxes or other light shaping tools. These light shaping devices significantly reduce the light that lands on the subject.

Continuous lights are not able to generate nearly the power of a strobe unless they become dramatically larger and heavier than a strobe which makes them impractical. The advent of COB, or chip on board led arrays, allows many hundreds of LEDs (light emitting diodes) to be arranged in a tight group on a single chip of silicone as small as 12 mm in diameter, while having the ability to deliver over 10,000 lumens of light. Because of the physics of optics, these smaller light sources allow light from a COB to be focused into a tight beam or managed into other types of beams for photographic work using carefully engineered optical elements placed directly front of, and most often in very tight proximity to the COB.

Strobes, due to their power and source, a semi-circular or longitudinal glass tube filled with gas, are often modified with large reflective fabric boxes and scrims that take the power of the strobe and direct it at the subject, softening the light and controlling its spread. These devices, called "soft boxes", drain a significant amount of the light power generated by the strobe.

Optics placed in front of a COB array can be 80 to 90% efficient at light transmission while controlling where the light goes. COB arrays can also be overdriven beyond their rated continuous capacity in a short burst. A major limiting factor in LEDs is cooling. Short bursts can be achieved without violating the thermal restrictions around managing COB led arrays. In this way a COB that can generate 10,000 lumens of continuous light may be pushed in short bursts to 2 or more times the steady state output. The burst output could be augmented with additional LEDs that are engaged only during the burst operation to further increase the burst power. This amount of light or lumen power is combined with optics that focus that light efficiently on the subject. This means that a pulsed COB LED array may be able to match the power of strobes for delivering usable light on the subject.

Digital camera technology is also advancing. The camera sensor's sensitivity to light has improved dramatically. The sensitivity of the sensors allow them to operate effectively with far less ambient light. This trend is expected to continue.

Next generation cameras are moving away from a mechanical shutter controlling the light hitting the sensor to direct on/off control of the sensor itself or a "rolling shutter." This works like a window shade being moved across the sensor. There are in fact two shades, a leading and a following shade that expose lines of the sensor as it scrolls across the sensor. In high speed photography, only portions of the sensor are exposed at a time as the slot of light moves across the sensor controlled by the leading and following shade speed. This rolling shutter is typical of "high speed sync" which involves camera exposure speeds beyond $\frac{1}{250}$ of a second. In high speed sync, strobes have a distinct disadvantage—they must fire multiple times to expose the entire sensor to light because a strobe duration is only $\frac{1}{8000}$th of a second. The LED pulse of this invention can stay on for the duration of the rolling shutter exposure while a typical strobe pulse can only emit light for about $\frac{1}{8000}$ of a second. To make a rolling shutter work with a strobe, the strobe has to reduce its power and fire multiple times in sync with the rolling shutter to ensure every line of the sensor is exposed to the same amount of light. For the strobe to fire multiple times in rapid succession, the strobe power is reduced because for these short duration flashes the strobe only has a single charge to tap. Strobes require 1 to 2 seconds or more to recharge after firing. To fire faster, the strobe must allocate the single quantity of stored power across multiple bursts.

The described invention detects the signal that controls the camera sensor and fires the COB array synchronized with electronic shutter to flood the scene with light during the time the sensor is on. Given that the sensor on-time is short, measured in milliseconds, it allows the COB array LED to be driven up to 3 times its continuous operation level without thermal degradation or overheating of the COB. In this manner a single COB LED array powered in a self-contained design allows for a single light that can replace strobes as well as work as a continuous light when shooting video. As most digital cameras take photos and are able to shoot video, the invention of a single high power light that supports both types of camera use—photo and video— represents a significant advancement in the art. Other products exist on the market today that combine strobes and continuous lights but they require a strobe circuit and flash tube in combination with an LED array. These hybrid products require more circuitry, more expense and are larger and bulkier and more costly than this invention.

The invention has two control inputs. One is a dial that allows the user to turn on the continuous light and adjust the output up to the maximum continuous lumen output. The second input is for a wired or wireless signal to override the continuous mode and pulse the COB LED at a far higher power level with a short duty cycle tied to the shutter opening of the camera, or image sensor.

Prior to this invention, devices such as phones with cameras have demonstrated a low power LED that can flash or be used as a flashlight. The flashlight mode does not work in conjunction with the camera. These are very low lumen devices with the light integrated into the phone itself. They do not intentionally overdrive the LED to create a flash and they are not controlled remotely.

There are distinct advantages in image quality to have the light source remote from the camera. For one thing, photo quality is always better when a flash or illumination source is not straight-on to the subject. The market has combination devices that have a flash tube and an LED light in the same device to support both functions, but these lights are bulky and still have the drawback that the strobe function needs a recycle time between flashes. The ability to control the light with optics is highly constrained due to the nature of housing a semi-circular flash tube or a linear flash tube and LED array adjacent on the face of the light. Clustering two light sources of different shapes adjacent to each other and then trying to optimize optics for them is nearly impossible. Further complicating this approach is the fact that the strobe pulse requires a high voltage, obtained with the use of large high power capacitors, whereas the continuous light needs a battery power source at stable voltage.

There are additional advantages of a COB LED array overdriven in use as a digital burst light to fire multiple times a second with minimal recharge time compared to a strobe. A top end strobe still needs 1-2 seconds or more to recharge before the next flash. After multiple flashes the strobe heats up to a point that it needs to be shut down to cool. The ability for an LED array to fire multiple times a second for extended periods of time represents a major breakthrough for still photography image capture. For example, capturing motion at a sporting event. The invention herein could flash 10 times a second tracking a runner sprinting along a track start to finish. A strobe could only capture perhaps one image per second. But a camera can easily shoot 10 frames a second. The LED is also more efficient than a strobe and can run for longer from a similar power source.

At shutter speeds faster than 1/250 th of a second strobes have significant limitations and can only deliver a fraction of the power in the light flash. The effective range of the flash is drastically reduced as the shutter speed is increased. Even with a good speedlight (small strobe) like Canon's 580exii the effective range shooting in daytime with shutter speeds over 1/500th of a second photo would probably be under five feet, maybe less. It might be acceptable with a headshot of a single model but not in sports or wildlife photography. The invention allows both continuous light output and a digital burst that delivers more power in the burst than continuous mode. This dual function from a single light is a breakthrough for photography and video. The digital burst is superior to a strobe in that it can fire with no loss of power 10 times or more a second and continue firing at that pace with no overheating and no loss of output no matter what shutter speed.

Design of Circuit to Create Digital Burst of an LED or LED Array:

Conventional constant-current or controlled voltage regulator circuits intended for powering light emitting diode (LED) devices are usually limited to operating within a fixed range with a single control and feedback gain resolution (input control signal change divided by output signal change). If one wants to primarily operate within an output drive level of 0 to 1×, but occasionally pulse up to a much higher drive output level such as 2× or 4×, the state of the art circuit and chips are not designed to support two different peak lumen outputs depending on whether the device is operating in steady-on mode or a high-power duty cycle pulsing the light on/off. Conventional regulator circuits are designed for a fixed maximum output range (4× for example) while the input control level command signal is reduced to one fourth to operate at the primary level of 1×. This typically results in an undesirable loss of control resolution within the primary 0 to 1× operating range.

The values of the regulating circuit's sensing elements are typically integral to defining the control range of the regulating circuit. Other LED pulse drive implementations might simply accept the undesired reduction of control resolution and leave the output range set to maximum.

One way to accomplish a high-power pulse drive would be to dynamically change the sensing element feedback values to allow dynamically changing the regulator circuit's output range from 1× to 4× (as an example) for producing a higher power well-regulated pulse output. This would ordinarily require use of suitably rated power switching components to switch in or out different value sensing elements to change the range. This is undesirable due to the size and cost of power switching components.

Instead, the invention provides methods that do not require the addition of high power switching components, but still allow the regulating circuit to be rapidly switched via a mode switching means from one output range, to a higher output range while maintaining the maximum control resolution for both output ranges, and consequently high resolution control of both the constant lighting level, and the higher pulse lighting level.

Rather than using additional power switching elements to dynamically switch in different sense element values, another way is to use sensing elements with multiple signal taps and/or extra sensing elements in an arrangement such that only the signal level connections to the regulating circuit need to be switched. This can be done with smaller and less costly signal level switching devices. In this kind of solution, the effective value of the sensing element(s) from the perspective of the regulating circuit's sense inputs, is changed, i.e. scaled, by connecting those sense inputs to only a portion of the total effective sense elements which exist in the overall power portions of the circuit. This has the effect of scaling down the feedback control signal.

However, the pulse system can be optimized still further. Instead of using specialized multiple-signal-tap sensing elements or arrangements of multiple individual elements such as multiple current sense resistors in series, we can apply a signal-level active switch arrangement and scaling network of physically smaller signal-level passive components to scale the level of the signal coming from the conventional fixed-value sensing element. From the perspective of the rest of the regulating circuit, when the active signal-level switch(es) are engaged, the feedback signal gain(s) are changed which electrically is equivalent to changing the characteristic values of the power sensing element(s). Further, a similar signal-level switching technique can be used to dynamically change the regulator circuit's feedback compensation loop characteristics by switching in or out other signal-level passive or active components to adjust or optimize regulating loop compensation between the primary and secondary—or pulse—power output levels.

It is an object of the invention to operate an LED light power circuit in two modes: a continuous light mode, at a level that can be maintained continuously, and at a much higher level in a pulse mode wherein high-power pulse drive produces pulses of light that can be repeated in a rapid succession, such as 10 per second, in an efficient circuit not requiring high-power switching, the change in mode being made by a mode switching means of the invention. These and other objects, advantages and features of the invention will be apparent from the following description of a preferred embodiment, considered along with the accompanying drawings.

DESCRIPTION OF PREFERRED EMBODIMENTS

Figure 1:
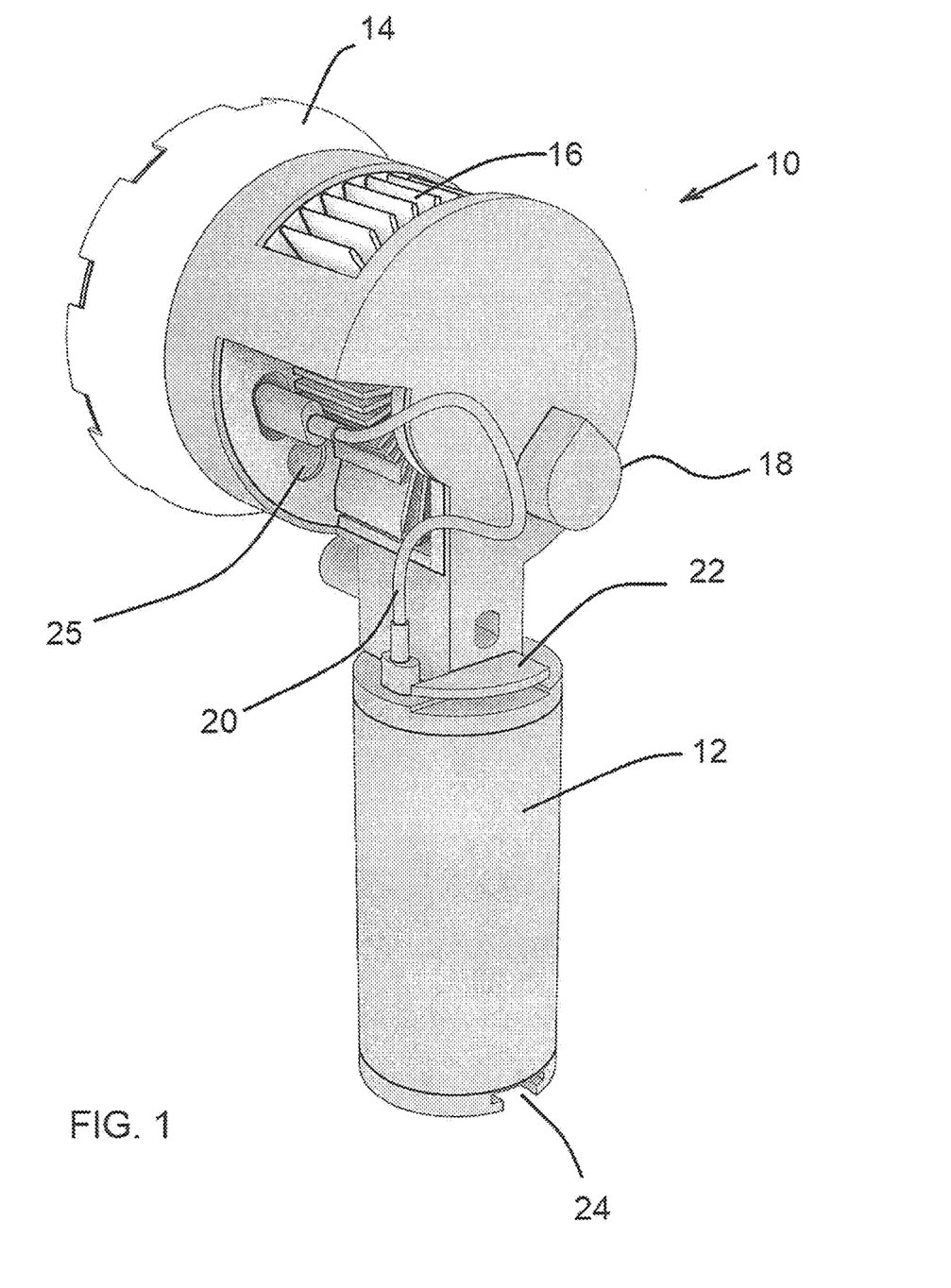
FIG. 1 is a perspective view showing an LED lighthead of the invention as mounted on a battery enclosure that can serve as a handle.

FIG. 1 shows a lighthead 10 of the invention mounted on a tubular battery enclosure 12 that is also a handle for the light allowing it to be hand held. On the face of the light is a user mounted optic holder 14 retaining an optic that focuses the native beam from the LED light. The head shows fins 16 of a heat sink that removes heat from electronics and LED array. A power dial 18 on the back of the lighthead allows the user to adjust the output from, e.g., 500 lumens to the maximum power output. Also visible on the back side of the lighthead is a USB-c cable 20 connecting the lighthead 10 and circular battery pack 12. Adjacent to the USB-c connector as it enters the battery pack is a raised release lever 22 that when pressed allows the lighthead to slide off the battery. Visible on the bottom of the battery pack is a dovetail feature identical to the dovetail feature 24 at the base of the lighthead. These mounting features allow either the complete light and battery or the lighthead alone to mount to typical photography stands including tripods and lightstand with an interface piece. The lighthead may also include mounting features to support attaching of soft boxes or other light shaping tools.

A port 25 is provided to receive a camera shutter signal for digital burst operation.

Figure 2:
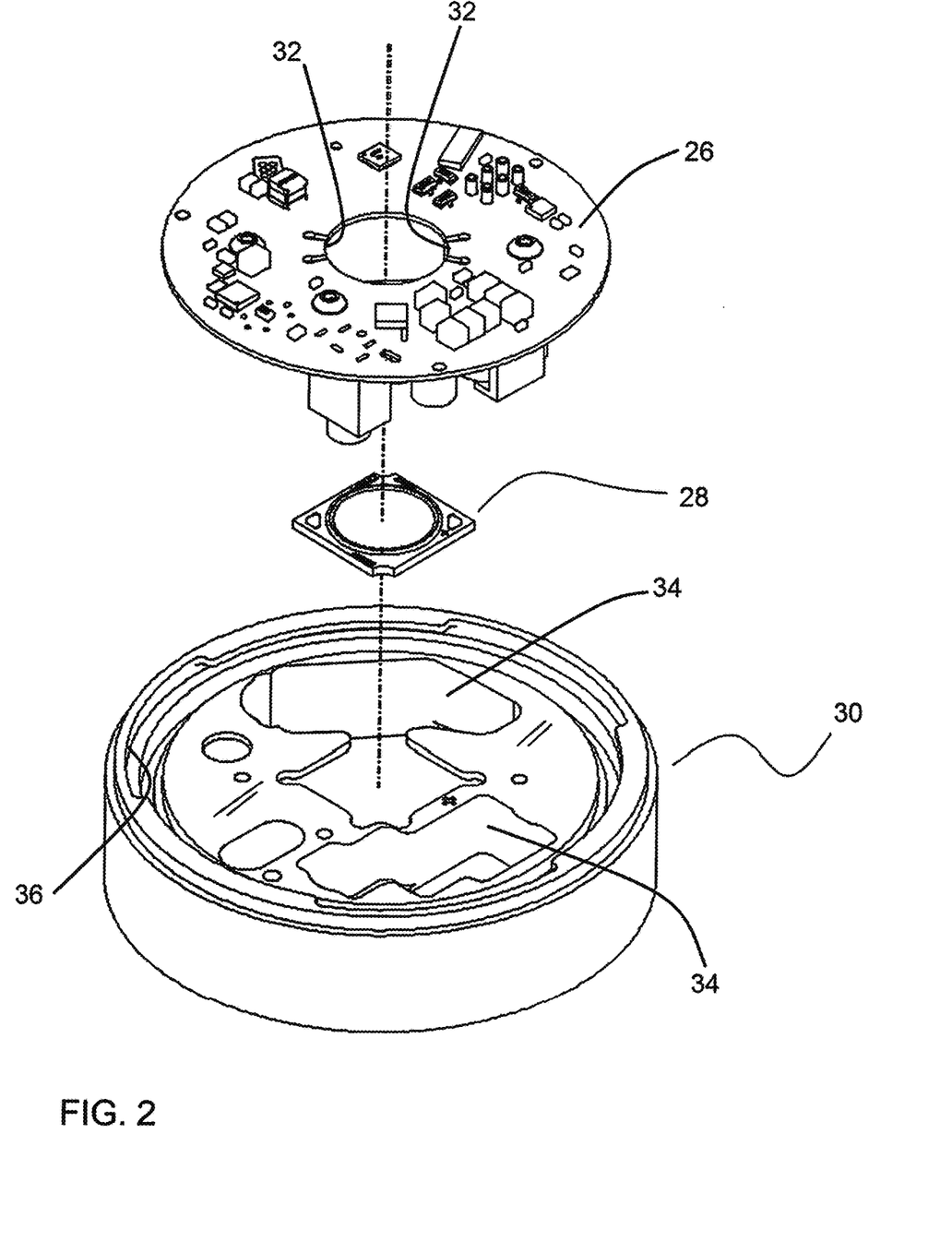
FIG. 2 is an exploded perspective view showing a face of an assembly of a driver circuit and LED as they are attached to a heat sink.

FIG. 2 shows the face of the assembly of the driver circuit 26 and LED 28 as they attach to the face of the heat sink 30. The driver circuit 26 is mounted coplanar with the LED 28. The LED drops into a slight cavity machined in the heat sink 30 that is about one half the depth of the overall LED height. This assembly is similar to that shown in patent application Ser. No. 15/973,382, now U.S. Pat. No. 10/448,503, the disclosure of which, in regard to LED array and lighthead structure, is incorporated herein by reference. The perimeter of the driver circuit board then screws down to the heat sink 30 and presses the LED tightly against the heat sink. Two or more spring arms 32 extending from the driver circuit board extend to press the LED down as well as make electrical contact with the LED to deliver the power to control the light output. The typical assembly will include a thermal paste or film that optimizes the thermal path from the LED to the heat sink 30. The heat sink shows cavities 34 that allow space for components mounted on the underside of the heat sink. These components may include capacitors that store charge to deliver the pulse of high power as well as large components such as inductors that would interfere with the beam pattern of the LED if mounted on the face. The face of the heat sink shows a circular cavity 36 around the perimeter that receives the optic holder which mounts with a one-quarter turn engagement and creates a watertight seal for the electronics and LED when installed.

Note that a small fan can be included in the assembly to increase heat dissipation of the heat sink. Further, interchangeable lightheads can be provided to allow the user to change the light color temperature with a head swap.

Figure 3:
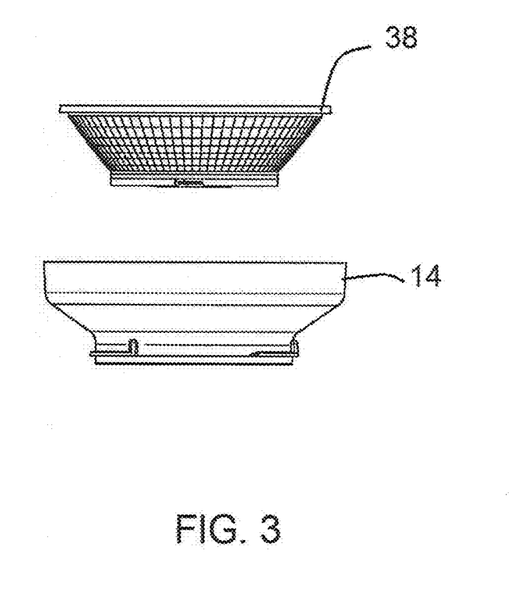
FIGS. 3 and 3A are elevation and perspective views, exploded, showing a bayonet mount and holder that mounts to the face of the lighthead.
Figure 3A:
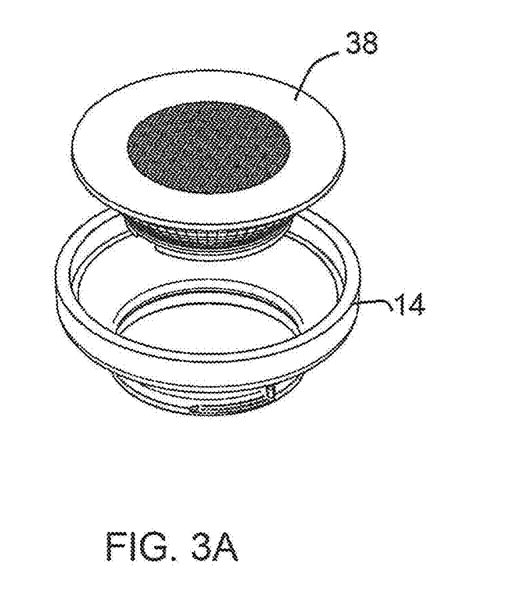

FIGS. 3 and 3A show the bayonet mount holder 14 and optic 38 that mount to the face of the lighthead, so that the beam is focused depending on the type of optic mounted in the holder. The beam focus can range from 90 degrees down to a tight 12 degree beam depending on what the user is trying to light.

Figure 4:
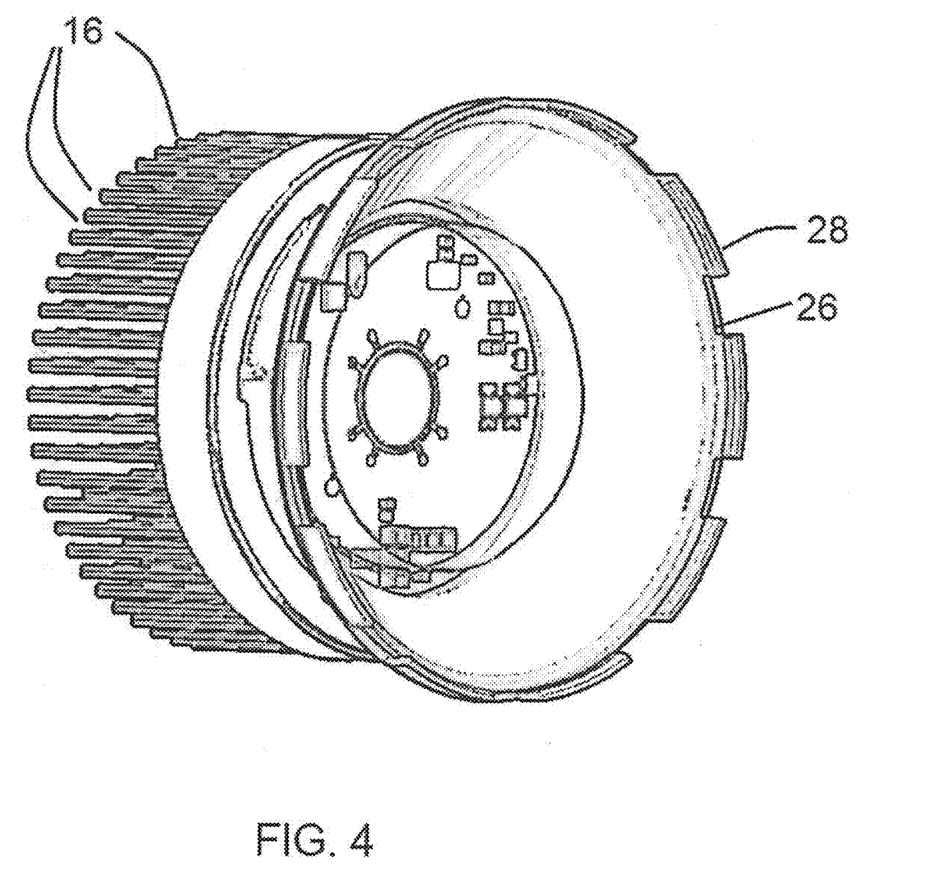
FIG. 4 is a perspective view showing the face of the LED array and parameter driver circuit seen through the mounted optic, as part of the lighthead.

FIG. 4 shows the face of the LED array 28 and perimeter driver circuit 26 seen through mounted optic that employs a perimeter seal using an O-ring against the face of the bayonet. Also visible are the cooling elements 16 on the back side of the head. In another embodiment the lighthead can be remote from and wired to a battery, such as for use on a drone. Another application is that the light unit can be synchronized to flash with a drone-mounted camera.

In a further embodiment the light unit is waterproof and submersible, for use in underwater photography.

Figure 5:
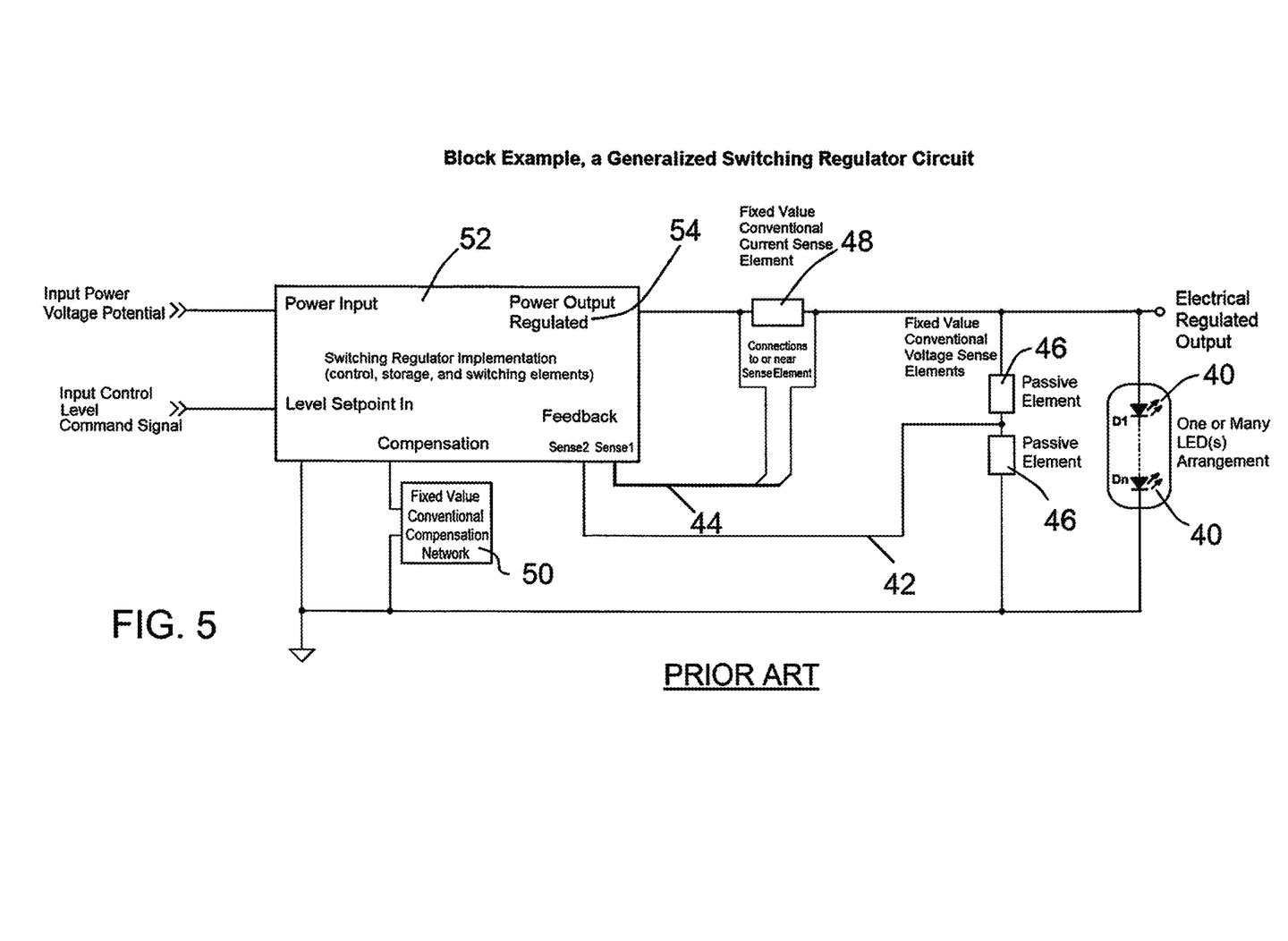
FIG. 5 is a schematic circuit diagram to illustrate a prior art LED power control circuit, without the features of the invention.

FIG. 5 shows a generalized block diagram of a circuit for an LED arrangement controlled by a generalized conventional switching power supply regulator circuit of the prior art. LEDs are indicated at 40. Signal connections 42, 44 from sense elements 46 and 48 and a feedback compensation 50 are connected to a regulator functional block portion 52 of the circuit. Power output is regulated accordingly, as indicated at 54.

Figure 6:
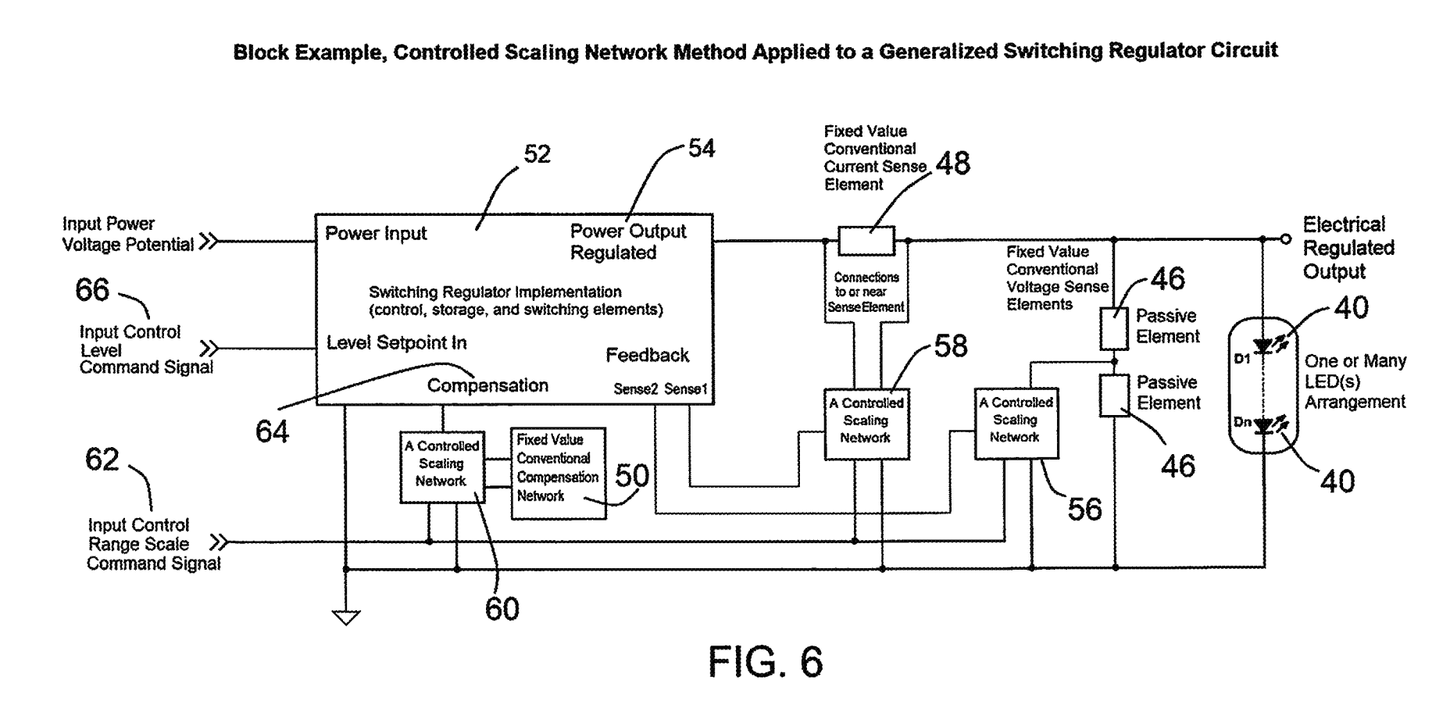
FIG. 6 is a schematic circuit diagram showing an LED power circuit according to the invention, with controlled feedback scaling networks to change the value of feedback signals.

FIG. 6 shows a generalized block diagram/circuit diagram utilizing a conventional switching regulator 52 controlling an LED array 40, but with features in accordance with the invention, namely, "controlled scaling networks" 56, 58, 60 inserted between the sense element(s) 46, 48 and the switching regulator functional block 52. As discussed above, these controlled scaling networks scale the signal from at least one sensor element (three shown here) and feed the scaled-down feedback signal(s) to the switching regulator 52 as shown. The controlled scaling networks are controlled by an input control range scale command signal as indicated at 62, which can be the opening of a camera shutter. Compensation by the regulator 52 is indicated at 64, compensation being based on the scaled feedback signal. Note that when the input control 62 does not call for scaling for a high-power pulse mode, the normal continuous light mode can be active, with adjustable level control as indicated at input control level command signal 66.

Note also that multiple sensing networks are indicated because there could be one or more controlled scaling network blocks depending on the complexity of the regulating section. Often, higher power regulator circuits use multiple feedback inputs and sense elements, and in order to achieve most accurate and fastest response, more than one signal needs to be scaled. The scaling network at 60 can be used to adjust the effective characteristics of the feedback loop compensation network at 50 in order to achieve best regulating performance in the two different modes of 1) primary output level and 2) higher-power pulse duration level, because the compensation network may need to be scaled or manipulated between the two modes. It is not required, but without manipulation of the compensation network, the higher-power pulse response may be slow or not be critically damped to provide the best possible rectangular pulse power shape and best regulation response in both modes. The compensation connection point of the regulator function block is connected to a point between the feedback summing and output amplifiers internal to the conventional regulator function block.

Figure 6A:
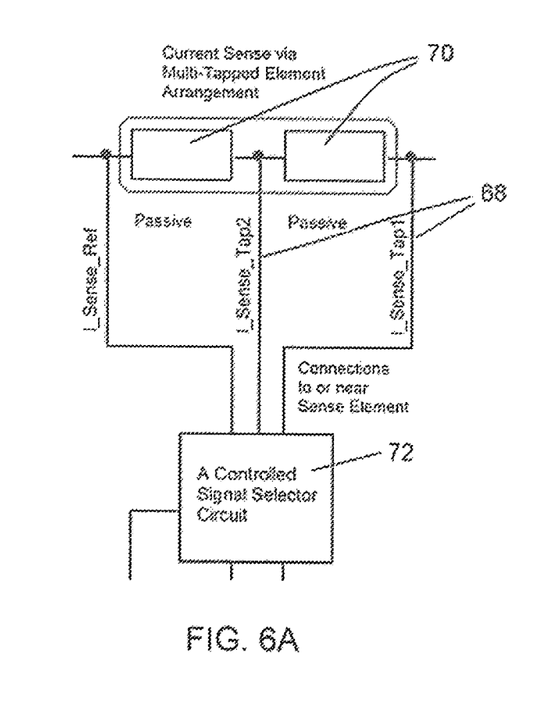
FIG. 6A is a schematic drawing showing an alternative feedback scaling arrangement.

FIG. 6A schematically indicates an alternative described above, with multiple signal taps 68 at current sense 48, and also showing multiple sensing elements 70, with a selector circuit 72 selecting between the taps, to control whether or not the signal from the sensors is to be scaled down to increase power to the LEDs for the pulse mode. This scaling means is an alternative to the scaling networks shown in FIG. 6 and described above. A similar multi-tap or multiple sensor arrangement can also be applied at the voltage sense elements 46.

Figure 7:
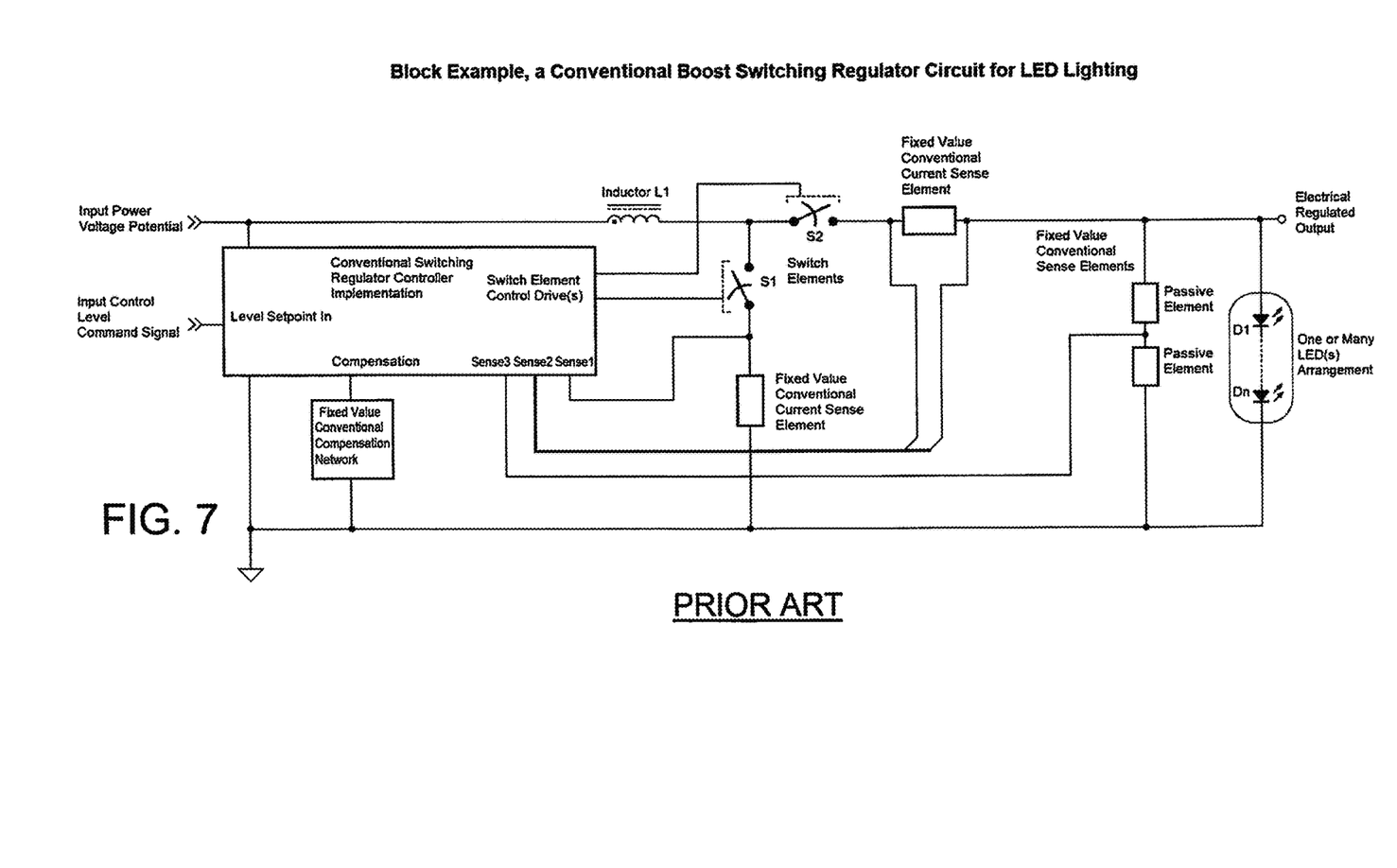
FIG. 7 shows a schematic prior art circuit with a boost switching regulator circuit.

FIG. 7 shows a block circuit diagram of a conventional boost circuit topology version as in the prior art. This is the same style implementation with a switching regulator as in FIG. 5. Some LED power controls utilize such a boost circuit. A conventional boost circuit may in some cases provide a high-power pulse in response to a pulse on the input control level command signal. However, it will have poorer control resolution in the lower, constant output level range. The current system provides for rapid switching of the dynamic range to achieve fine control resolution in the low range while still providing good response and control in the higher-power pulse regulation range. Our method of applying controlled scaling network(s) in the feedback loop(s) (or being able to switch to different proportional signal tap connections on sense elements or arrangements of elements as described above) allows rapid changing of the regulation power range for the purpose of transitioning from one primary regulated output level to a significantly higher regulated output level and back again, while maintaining maximum feedback resolution in the primary level output range. Active elements are used to switch the signals from the conventional current sensing elements through a scale changing network before joining the rest of the regulating circuit. This method results in ability to produce a high efficiency, well-regulated, fast rise and fall, rectangular average peak value waveform, electric current pulse to power a single or combination of LEDs to a high output level, effecting a transition between a constant lighting level, and a higher output, pulsed duration lighting level.

Figure 8:
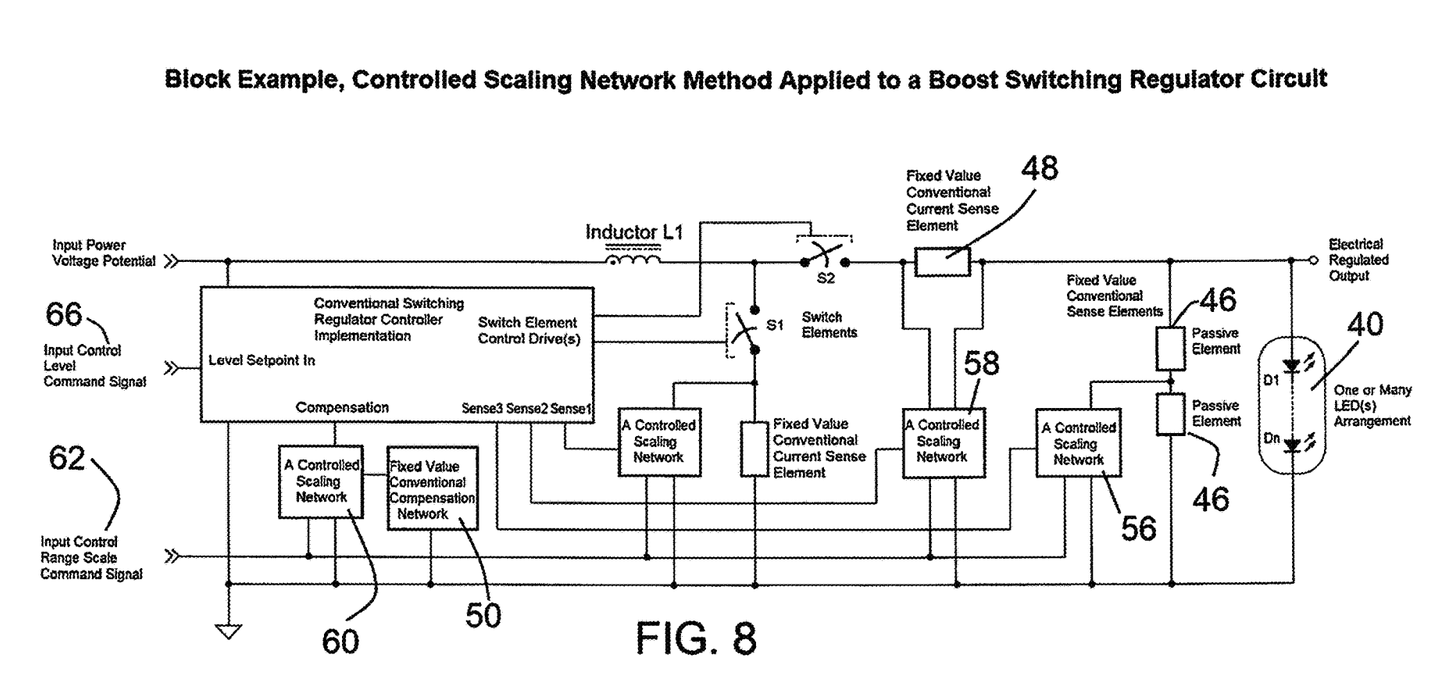
FIG. 8 is a similar schematic view with features of the invention applied to a boost switching regulator circuit.

FIG. 8 shows the conventional circuit of FIG. 7, but with the scaling that works for scaling down the feedback signal from sensors.

In a conventional LED control circuit there are sense elements that might sense current if the circuit is adjusting current to affect the output, or sense voltage or feedback from a switch and inductor element to affect output. The current innovation employs a controlled scaling network to intercept and scale the signal from the sense element before the signal is received by the switching regulator. The system controls the network based on the "input control range scale command signal" 62 and/or the "input control level command signal." 66.

For example the "input control range scale command signal" (FIG. 6 or FIG. 8) may react in response to a signal that the camera shutter is opening. Based on that input from the camera, the scaling network intercepts the current sense signal and scales it to "trick" the circuit into delivering a pulse of power that is some multiple greater than the power the current sense element is otherwise requesting. The duration of the pulse can be controlled in any of several different ways, including but not limited to detecting light back from subject; a clock timer or programmed interval signal from a programmable controller; or a camera shutter duration signal.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A self-contained powered luminaire comprising an LED or LED array with regulating circuitry including voltage and current sensing elements sensing power output from a power regulator and producing feedback control signals to the power regulator, with mode switching means within the circuitry allowing the LED array, by modifying the feedback control signals, to operate in a primary continuous mode up to a continuous mode maximum input power to the LED or array or in a pulsed mode wherein the same LED or array or a portion of the LED array is pulsed to a higher regulated output light level of pulsed duration at an input power higher than continuous mode maximum input power utilizing the circuitry while maintaining maximum feedback control resolution in the primary continuous lighting mode, the mode switching means comprising a range scaler with a signal feedback scaling means for producing a scaled down feedback control signal from the current sensing element or the voltage sensing element or both, so that when the mode switching means is engaged, feedback signal gains are proportionally changed equivalent to values of the sensing elements being changed, the lower feedback signal values causing input power to the LED or array to be increased for said pulsed mode.

2. The luminaire of claim 1, wherein the continuous mode maximum power produces at least 5000 lumens.

3. The luminaire of claim 1, wherein the LED comprises a chip on board (COB) LED array.

4. The luminaire of claim 1, wherein the output light level of pulsed duration is at an input power to the LED array four or more times the continuous mode maximum.

5. The luminaire of claim 1, wherein the signal feedback scaling means comprises at least one scaling network in the circuit, receiving one or more feedback control signals from the sensing elements in the circuit and scaling the feedback control signal to a lower value so that the lower feedback signal goes to the power regulator which raises the output of the LEDs to a higher output for the pulsed duration.

6. The luminaire of claim 1, wherein the pulsing of the LED or array is initiated by an input control signal.

7. The luminaire of claim 6, wherein the input control signal is from the opening of a camera shutter.

8. The luminaire of claim 1, further including a rechargeable battery contained in a battery casing that forms a handle to hold the luminaire, the casing having a receiving element that allows the battery casing and luminaire to be releasably mounted on a light stand or tripod.

9. The luminaire of claim 8, wherein the battery casing has a charging port, such that when disengaged from the luminaire the battery can be charged remotely.

10. The luminaire of claim 1, including a lighthead containing the LEDs and circuitry, which comprise a coplanar LED and driver array that is sealed from weather and including optic elements that mount to the exterior of the lighthead creating a weather tight seal when installed.

11. The luminaire of claim 1, including a lighthead containing the LEDs and circuitry, and further including a rechargeable battery pack in a weathertight casing.

12. The luminaire of claim 11, wherein the lighthead connects to the battery using a universal service bus-c (USB-C) cable.

13. The luminaire of claim 11, wherein the rechargeable battery pack has a capacity of at least 30 watt-hours.

14. The luminaire of claim 11, wherein the lighthead has a perimeter bayonet mount to attach optics in close proximity to the LEDs to focus or diffuse light from the LEDs.

15. The luminaire of claim 11, wherein the lighthead has a foamed metal matrix, brazed or otherwise thermally attached to a back side of a heat conducting plate holding the LEDs and circuitry, thus providing a large surface area for air cooling of the heat sink.

16. The luminaire of claim 1, wherein pulsing of the LED or array is initiated by an input control signal from opening of a camera shutter, the circuitry being synchronized with the camera shutter using wireless communication.

17. The luminaire of claim 1, further including capacitors in the regulating circuitry that allow a higher power buildup for the higher-regulated output level, to support higher power pulsed bursts of light.

18. The luminaire of claim 1, wherein the signal feedback scaling means includes a signal-level active switch arrangement and network of physically smaller signal-level passive components to scale the level of the signal coming from a conventional, fixed-value sensing element, such that when the active signal-level active switch arrangement is engaged, feedback signal gains are changed, equivalent to characteristic values of the sensing element being changed.

19. The luminaire of claim 1, wherein the signal feedback scaling means includes multiple signal connection tap locations on said sensing elements, to allow signal-level switch circuitry to connect to selected tap locations of the sensing elements, to facilitate quickly decreasing a feedback signal which is otherwise proportional to a feedback control signal prior to the mode switching means being engaged.

* * * * *